United States Patent [19]
Bomboire

[11] 3,905,849
[45] Sept. 16, 1975

[54] TEXTURED SHEET MATERIAL AND METHOD OF PREPARATION THEREOF

[75] Inventor: Rene F. Bomboire, Wiltz, Luxemburg

[73] Assignee: Eurofloor S.A., Luxemburg

[22] Filed: Aug. 21, 1973

[21] Appl. No.: 390,237

[30] Foreign Application Priority Data
Aug. 31, 1972 Luxemburg .......................... 65989

[52] U.S. Cl. ................. 156/79; 156/212; 156/214; 156/277; 264/132; 427/265; 428/156; 428/159; 428/161; 428/172; 428/203; 428/204; 428/315; 428/320;
[51] Int. Cl.² ................... B32B 31/06; B32B 31/12; B32B 31/26; B32B 3/18
[58] Field of Search ............. 156/79, 209, 212, 214, 156/220, 277; 161/119, 160, 145, 39, 413, 146; 264/132; 117/10; 11; 15; 45

[56] References Cited
UNITED STATES PATENTS

| | | | |
|---|---|---|---|
| 2,920,977 | 1/1960 | Adams | 156/79 |
| 2,961,332 | 11/1960 | Nairn | 156/79 |
| 3,293,094 | 12/1966 | Nairn et al. | 117/69 |
| 3,310,422 | 3/1967 | Petry | 117/11 |
| 3,373,068 | 3/1968 | Grosheim et al. | 156/277 |
| 3,399,106 | 8/1968 | Palmer et al. | 161/119 |
| 3,408,248 | 10/1968 | Maass | 161/119 |
| 3,655,312 | 4/1972 | Erb et al. | 156/209 |
| 3,804,657 | 4/1974 | Eyman et al. | 117/11 |

FOREIGN PATENTS OR APPLICATIONS

| | | | |
|---|---|---|---|
| 817,136 | 7/1959 | United Kingdom | 156/79 |
| 1,124,472 | 8/1968 | United Kingdom | |

*Primary Examiner*—George F. Lesmes
*Assistant Examiner*—Charles E. Lipsey

[57] ABSTRACT

The manufacture of sheets of resinous material having a permanent relief is disclosed. A process in accordance with the invention contemplates the printing of a design on the verso of a transparent sheet followed by application of a discontinuous layer of material, over selected portions of the printed design, and lamination to a support medium. During lamination the relief defined by the discontinuous layer will be transferred to the recto of the transparent sheet by flowing of the sheet and lamination may be followed by expansion to enlarge the relief effect if the material defining the discontinuous layer includes a blowing agent.

11 Claims, 8 Drawing Figures

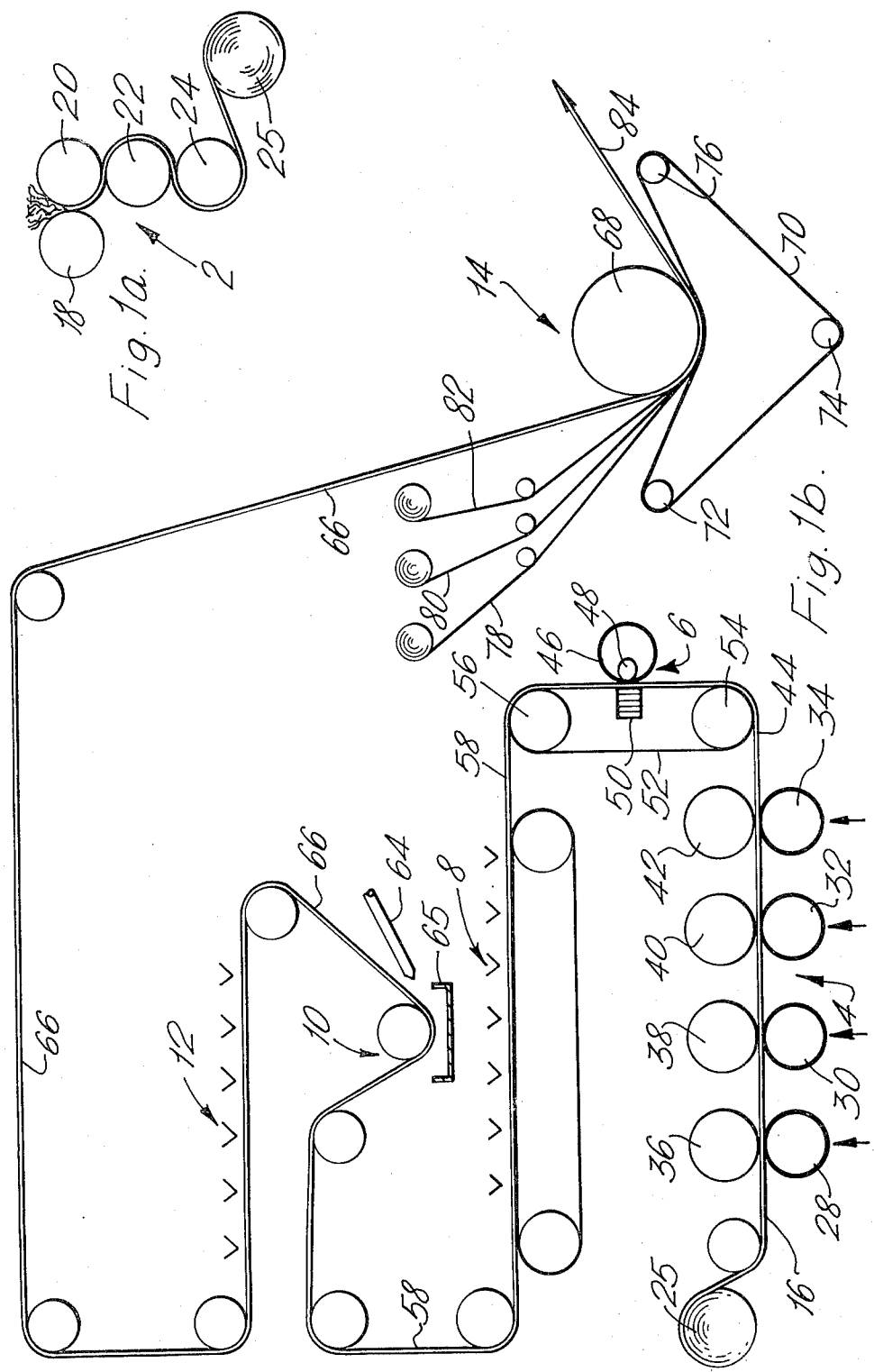

TEXTURED SHEET MATERIAL AND METHOD OF PREPARATION THEREOF

BACKGROUND OF THE INVENTION

1. Field of the Invention

The present invention relates to textured sheet material, and particularly surface coverings, comprised of synthetic materials. More specifically, the present invention is directed to a method of the manufacture of sheets of resinous material having a permanent relief and being particularly well suited for use as floor or wall covering. Accordingly, the general objects of the present invention are to provide novel and improved materials and methods of such character.

2. Description of the Prior Art

The field of technology related to the manufacture of synthetic surface coverings has long strived to imitate, in as realistic a manner as possible, the appearance of natural decorative elements such as wood, marble, stones, bricks, linens, leathers, etc. As a result of the development of improved printing methods, and particularly photo-engraving, reproduction of the exact or stylized appearance of these decorative materials is possible. However, printing processes are inherently two dimensional techniques and the effect of the third dimension; i.e., the appearance of texture or relief; may be obtained only by the printing of shadows or other optical stratagems. There are, in addition to printing techniques, other methods advailable in the prior art for imparting an appearance of depth (relief) to synthetic surface coverings. These other techniques include the incorporation of discrete elements of decoration, such as granulated materials of different colors or pastes of different materials, into the synthetic surface covering. The prior art processes which incorporate decorative elements in an effort to achieve the appearance of texture are exemplified by the disclosures of British Pat. Nos. 966,223 and 1,124,472.

Although some of the two dimensional techniques which give the appearance of texture provide a reasonably realistic effect, for both decorative and utilitarian purposes actual surface relief rather than the appearance of relief has nevertheless been desired. The best known prior art method of obtaining actual surface texture encompasses the embossing techniques which are widely used to imitate leathers and textiles and which are also used in the manufacture of thermoplastic synthetic surface coverings. The prior art embossing techniques include the permanent deformation of the covering surface, achieved through the use of a cylinder engraved in negative of the embossing which is desired, produced by laminating the product to be embossed between an embossing cylinder and a counter cylinder.

Embossing, although universally employed, has a number of inherent disadvantages. These disadvantages include limitations on the effects obtainable, the high cost of the embossing cylinders and the difficulty of embossing certain surface covering materials based on synthetic foam while simultaneously avoiding the delamination of the foam or the formation of bubbles between the layers resulting from destruction of the cell walls. Additionally, the prior art has encountered great difficulty in obtaining an embossing which perfectly matches the decorative pattern printed on the wear surface defining layer of a laminate. The latter difficulty in achieving a surface covering embossing which perfectly matches a printed pattern presents an insurmountable obstacle to the application of embossing techniques to the manufacture of synthetic plastic coverings. Printing of a decorative pattern is generally performed in a spearate operation from the embossing step and permanent deformations of the plastic material occur between one operation and the other thus increasing the difficulty in matching the print and the embossing. It is to be noted that attempts have been made to improve the matching between the print and the embossing such as, for example, through use of the apparatus disclosed in U.S. Pat. No. 3,655,312. Such improvements do not, however, overcome the other numerous disadvantages of embossing methods as applied to surface coverings comprised of synthetic resinous material.

Another improvement in the prior art embossing technique consists in covering the embossed cavities with ink thereby using the embossing cylinder as a printing cylinder. This technique is known in the art as "valley printing". While the technique of valley printing adds an element of decoration to simple embossing, this procedure does not allow any matching between the printing and the embossing and is limited to rather simple patterns. Also, although valley printing techniques achieve a certain degree of relief, this technique nevertheless permits obtaining only a rather limited decorative effect since it precludes the possibility of taking full advantage of modern improvements in printing techniques.

The introduction of cellular resinous compositions has permitted the development of techniques for obtaining an actual relief on synthetic surface coverings. This desirable result has been achieved by incorporating, in the paste or in the mixture which will be used for manufacture of a cellular sheet, blowing agents such as azidicarbonamide. These temperature sensitive blowing agents decompose and produce gases which form bubbles inside the sheet when subjected to temperatures which are sufficiently high as to also cause the sheet material to be in a viscous state. This operation is known in the art as "expansion" because the volume of the sheet is increased by the formation of bubbles. The expansion rate can vary as a function of the concentration of the blowing agent contained within the paste. The utilization of a blowing agent to obtain relief on a decorative covering material is disclosed in numerous patents such as, for example, U.S. Pat. No. 2,943,949. In U.S. Pat. No. 2,943,949 a paste containing a blowing agent is coated uniformly by induction on a previously embossed support. The inverse relief to that on the embossed support will be provided on the surface of the coated sheet by gelation and subsequent expansion of the blowing agent.

The expansion technique may also be utilized by employing inks having a resinous composition and containing different proportions of blowing agents. Processes wherein inks including blowing agents are printed on a support in accordance with the desired decorative effect are disclosed in U.S. Pat. Nos. 2,920,977 and 2,961,332. The use of inks including a blowing agent, as well as all other prior art expansion techniques, is characterized by the disadvantage that complex decorative effects can not be realized.

Another recently developed prior art technique for achieving a textured surface encompasses the use of an expansible plastisol containing a constant proportion of a blowing agent. This expansible plastisol is spread in a uniform layer on a support and, before the heating step, is printed with inks containing inhibitors and activators. The purpose of the inhibitors and activators is respectively to raise or lower the decomposition temperature of the blowing agent contained in the expansible plastisol. Thus, after heating, the resulting sheet will have a surface texture or relief which matches the pattern of the respective printed inhibitors and activators. Variations of the technique employing an expansible plastisol and inhibitors and activators are described in U.S. Pat. Nos. 3,293,094 and 3,293,108 and British Pat. Nos. 1,069,998 and 1,163,172. The use of an expansible plastisol and inhibitors and activators has the serious disadvantage that the technique can be successfully employed only in connection with the production of cellular products. Tests have shown that techniques wherein an expansible plastisol and activators and inhibitors are utilized can not successfully be utilized on a commercial scale with support sheets obtained by calendering. Furthermore, this technique is limited to printing methods which exclude, for example, processes such as quadrichromy. As is well known, quadrichromy, or four color printing, produces highly desirable decorative effects.

SUMMARY OF THE INVENTION

The present invention overcomees the above briefly discussed and other deficiencies and disadvantages of the prior art by providing an uncomplicated manufacturing technique which produces a composite synthetic covering material having a surface relief which matches perfectly with one or several printings. Thus, in accordance with the present invention, a decoration is printed on the verso of a transparent synthetic sheet using a known printing method. Thereafter, a discontinuous intermediate layer of appropriate paste is printed over the decoration; the paste being designed to provide a relief at selected places. Finally, the transparent sheet with the decoration and discontinuous intermediate layer on the verso is laminated to a support layer with the verso of the transparent sheet in contact with the support. The discontinuous intermediate layer of paste will form, after lamination, a relief on the recto of the transparent sheet as a result of the manner in which the laminating step is performed. The finished product is thus composed of a plurality of different materials; i.e., a transparent sheet, the ink of the decoration, the paste of the discontinuous intermediate layer and the support.

Since the transparent synthetic sheet will be located on the upper or outer side of the finished product, the transparent sheet is formulated in accordance with the intended usage of the finished product so as to have particular characteristics such as good resistance to wear, resistance to chemical agents, resistance to light, etc. In accordance with a preferred embodiment of the invention the transparent sheet is a vinyl film such as polyvinylchloride (PVC) or polyethylene.

The vinyl film should be transparent enough to allow patterns printed on the verso thereof to appear on the recto. Furthermore, the vinyl film should be free from surface defects, particularly grains and asperities which would effect the printing quality, thus permitting the use of printing techniques such as heliography. The surface of the vinyl film may be glossy or matte according to the intended usage of the finished product. The vinyl film may be obtained by any of the known processes of calendering, coating on an intermediary support, coating on metal bands, strip extrusion, blowing, etc. The thickness of the vinyl film will vary in accordance with the intended use of the finished product and will typically lie in the range of between 0.08 and 1.00 millimeters for a floor covering. Although a transparent vinyl film is preferred, any other transparent film of suitable material such as polyester may be employed in accordance with the present invention.

The decoration may be printed on the verso of the transparent sheet by any known process such as flexography, heliography, offset, silk screen printing, etc. The best results are generally obtained by heliography. Due to the transparency of the sheet, the decoration printed on the verso thereof will appear on the recto. The inks employed, when the transparent sheet is a vinyl material, are made of pigments diluted in polymeric and/or copolymeric vinyl solutions. These inks are generally not opaque thus allowing printing processes such as quadrichromy.

After printing the decoration on the verso of the transparent sheet, and drying of the print, a paste is applied in one or several discontinuous layers over the ink. Application of the paste is in accordance with selected areas of the decoration on the verso of the transparent sheet which, after lamination, will form the portions which are to protrude on the upper surface of the finished product. In accordance with a general aspect of the invention the pastes are preferably plastisols formulated so as to have the necessary rheological characteristics required for application in layers. These plastisol pastes, after gelation, must also provide the physical characteristics required for the intended usage of the finished product. The thickness of the layer or layers of paste will depend on the effect which is desired. A surface relief having protruding areas of a height of 0.1 to 0.2 millimeters provides sufficient texture for most applications. This degree of relief is easily obtained through a single step application of a layer of plastisol of thickness commensurate with the relief height desired.

Should the desired "embossing" exceed a thickness obtainable through a single step paste application, the intermediate layer may be applied via several consecutive operations with a gelation of the plastisol after each operation. Different levels of relief may also be obtained in this manner.

The pastes which comprise the discontinuous intermediate layer of textured sheet material produced in accordance with the present invention may contain a blowing agent, such as azodicarbonamide, which permits the obtaining of a cellular structure in the relief areas by means of heating and expansion. Restated, in accordance with the present invention, if a relief effect in excess of that provided by the unexpanded intermediary layer should be deemed necessary or desirable, expansion of the material comprising the intermediary layer may be achieved by heating subsequent to lamination. By including different concentrations of blowing agents in the expansible paste, different and distinct levels of relief may be obtained. In addition to a well pronounced relief obtained by application of an expansible paste, the cellular structure of the paste after expansion affords added resilience to the finished product.

Application of the discontinuous intermediate layer of paste must be done in perfect harmony with one or several colors or patterns of the printed decoration on the transparent sheet. To achieve such harmony between the decoration and the relief, the application of the paste and the ink is preferably done on the same printing machine. This machine will include, in addition to the printing cylinders or printing frames, an application cylinder or frame for the paste which operates in synchronism with the printing cylinders or frames. The present invention permits the use of various techniques for the application of paste in comparatively thick intermediate layers; i.e., the techniques of flexography, screened flexography, printing by piked cylinders or lamelles, heliography with very wide screens, rotary screen printing, etc. may be employed for paste application. Printing by rotary screen printing has been found to give particularly good results in the practice of the present invention. When it is desired to spread the paste in very thick layers results may be further improved by using rotary frames with wall thicknesses greater than 0.10 millimeters and a mesh of less than 30 cavities per linear inch. A serigraphic cylinder with a mesh size which is variable in accordance with the thickness of the desired intermediate layer may also be employed to permit different levels of relief to be obtained. The employment of such a serigraphic cylinder permits the achieving of relief designs of a complexity which were previously unobtainable.

If the transparent sheet is a vinyl film obtained by depositing a coating on release paper and is supported by this paper, the film thus being form stable, printing of the decoration and the application of the discontinuous intermediary layer of paste can be effected separately on different machines because the risk of distortion of the vinyl film is virtually non-existent.

As previously noted, the ink which defines the decoration is generally not opaque. Accordingly, the shade or coloration of the discontinuous intermediate layer will appear on the recto of the transparent sheet. This may, for certain applications, be undesirable. Accordingly, a uniform opaque coating either between the decoration and the intermediate layer or between the discontinuous intermediate layer and an underlying support sheet may be employed. If the opaque coating is between the ink and the paste the shade of the opaque coating will appear on the recto of the finish product and the coloration or shade of the intermediate layer will not be seen. If the opaque coating is applied after the paste, the coating may be of the same color as the paste or a different color. In the interest of insuring that the opaque coating will not have a deleterious effect on the relief defined by the intermediate layer, when the coating is applied after the paste, an "air-knife" application technique is preferably employed; this application technique resulting in the deposit of a uniform and thin coating independently of the conditions of the surface.

The opaque coating may or may not consist of a gellable material. If an opaque coating is employed and is applied after the deposition of the discontinuous layer of paste, the material employed for the opaque coating may be formulated so as to obtain adhesion between the printed transparent sheet and a sutable support layer.

In the case of a simple decoration, a single color pattern for example, the paste which defines the relief pattern may be colored and the printing of the decoration is not required. Restated, in a single color pattern the shading of the paste will appear on the recto of the transparent sheet and thus the decorative and relief effects are obtained in a single operation.

As previously noted, the transparent sheet having a discontinuous layer of paste will be laminated to a support sheet. The support sheet may comprise a second caldendered sheet, an unexpanded cellular sheet material, asbestos felt, any woven or non-woven fabric material, wood, metal, etc. A particular feature of the process in accordance with the present invention is the lamination step which results in the transparent sheet taking exactly the form of the paste-relief that it bears on its verso. The relief defined by the intermediate layer of paste on the verso of the transparent sheet is, after lamination, completely "transferred" to the recto of the finished product.

The lamination step comprises either a discontinuous process, employing a flat press, or a continuous process, employing an endless belt press. The lamination step will typically include the application of heat and pressure and is characterized in that at least one of the plates of the flat press or either one or both of the endless belt and cylinder of the belt press will be comprised of resilient material. The use of a resilient member in the laminating apparatus is in the interest of preserving the relief and insuring against crushing and flowing of the intermediate discontinuous layer of paste.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1a is a schematic representation of the method of manufacturing a synthetic film for use in the present invention;

FIG. 1b is a schematic representation of a preferred method of producing a textured covering sheet in accordance with the present invention.

DESCRIPTION OF THE PREFERRED EMBODIMENT

With reference to FIG. 1, the manufacturing process in accordance with the present invention includes the production of a transparent sheet 16 by calendering as indicated at step 2 in FIG. 1a. The production of transparent sheet 16 is followed by a decorative printing step 4, the application of a paste in discontinuous fashion in step 6, the gelation of the paste as indicated at step 8, the application of an opaque backing coating in step 10, the oven gelation of the backing coating in step 12 and the lamination of the thus treated transparent sheet to a support medium in step 14.

Figure 2A:
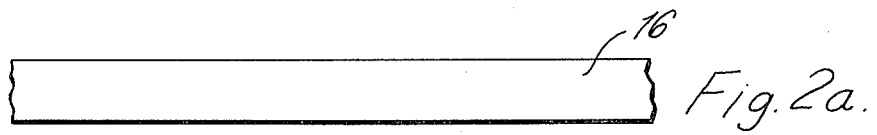
FIGS. 2a–2f represent cross-sectional side elevation views taken through sheet material produced in accordance with the present invention at various intermediate steps in the manufacturing process of FIG. 1b.

In accordance with the preferred embodiment, the transparent sheet 16 of FIG. 2a will be a vinyl film produced in accordance with the process indicated schematically in FIG. 1a. FIG. 1a represents the vinyl film being formed by calendering between cylinders 18, 20, 22 and 24. After calendering the transparent vinyl film is wound a roll 25 and may be stocked until use thereof is required. When use is required, as indicated in FIG.

Figure 2B:
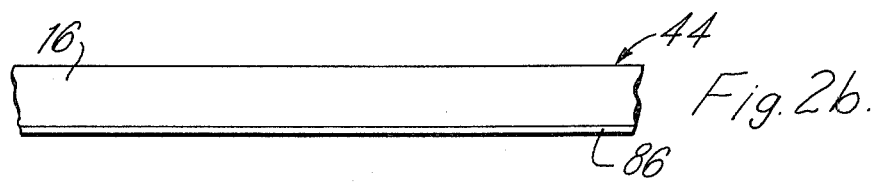

1b, the transparent vinyl film 16 is unrolled from roll 25 and, after passing through a guide cylinder, enters a printing machine which includes four printing cylinders 28, 30, 32 and 34. The printing machine also includes four back-up cylinders 36, 38, 40 and 42. Inks are supplied to the printing cylinders 28, 30, 32 and 34 in a manner well known in the art. A decoration, indicated at 86 in FIG. 2b, is printed on the verso of vinyl film 16 in the printing machine in the step indicated generally at 4. The inks used to print the decoration 86 are not opaque and thus the coated sheet 44 of FIG. 2b will retain a certain degree of transparency.

Figure 2C:
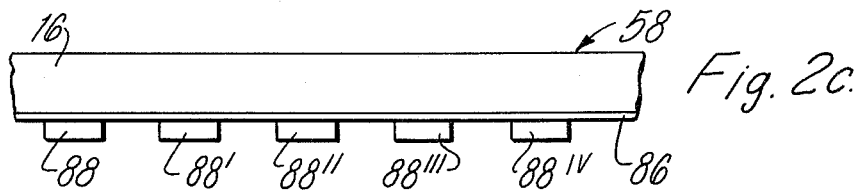

The printed vinyl film is provided, in the step indicated generally at 6, with a discontinuous intermediate coating layer indicated at 88, 88′, 88″, 88‴ and 88$^{IV}$ in FIG. 2c. The intermediate layer 88 is preferably comprised of a plastisol paste and, in the manner to be described below, will give the finished product the required relief. The relief desired must correspond exactly with one or several of the printed colors. Accordingly, it is preferable that the application of the plastisol layer 88 be effected in the printing machine in the interest of insuring synchronism between the printing rollers 28, 30, 32 and 34 and the device utilized for the application of the plastisol. As indicated schematically in FIG. 1b, application of the discontinuous intermediate layer of plastisol is accomplished employing the screen printing method known as serigraphy by means of a cylindrical rotary frame 46 having an internal roller-scraper 48. A pattern screen on the circumference on the cylindrical rotary frame 46 represents exactly the relief which is desired. The roller-scraper 48 forces the plastisol through the screen whereby the paste is applied in a more or less thick layer on the verso of the printed vinyl film 44 of FIG. 2b to produce the film indicated generally at 58 in FIG. 2c. The paste applying apparatus also includes a magnet 50 positioned to attract roller-scraper 48 whereby the roller-scraper is pulled against the internal wall of cylinder 46 in the interest of forcing plastisol through the screen. Test results have shown that this technique results in a high degree of uniformity of the applied paste even when coating large widths.

The rheological characteristics of the plastisol paste must, of course, be carefully selected to permit deposit of the paste on the transparent sheet by means of a screen printing method. The paste must be forced through the perforated printing frame by means of the roller-scraper 48 and, once on the transparent sheet, the plastisol must spread itself sufficiently to form a continuous layer and eliminate any trace of the screen while simultaneously maintaining the sharpness of the relief pattern. A web 52, carried by rollers 54 and 56, supports the vinyl film 44 during application of the plastisol. As previously noted, the rotary cylindrical frame 46 will turn in synchronism with the printing cylinders thus insuring a relief which is in harmony with the printed patterns as defined by one or a plurality of colors which form the decorative coating 86.

The discontinuous plastisol defining the relief portions 88, 88′, 88″, 88‴ and 88$^{IV}$ will be gelled, as indicated in step 8, by passing the film 58 through a gelation oven.

Figure 2D:
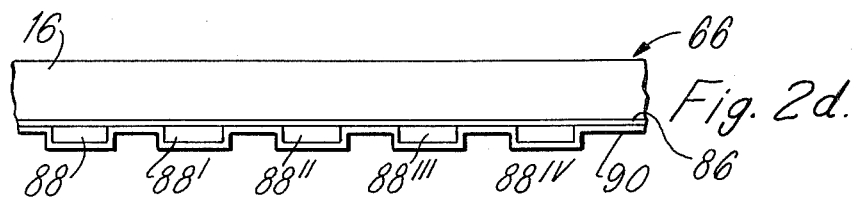

The semi-finished product, indicated as sheet 58, exiting the first gelation oven will be opaque only in the regions where the intermediate layer of plastisol 88 has been deposited. If sheet 58 were laminated to a support backing the coloration of the plastisol would appear on the recto of the film and those parts of the transparent film free of plastisol would at least partly assume the color of the support. For many applications this would be undesirable and thus it is generally preferable to coat the film 58 with an opaque and uniform backing layer. Accordingly, in the disclosed embodiment of the invention, a coating layer 90 of an opaque background material is applied over the plastisol and ink as indicated at step 10 to produce the composite sheet 66 shown in FIG. 2d. The background layer 90 is preferably comprised of a plastisol applied from a reservoir 65 employing an air-knife 64. As is known in the art, the air-knife technique will spread the coating material uniformly independently of the state of the surface over which the material is being deposited. The film with the opaque coating, indicated generally at 66, will next be passed through a second gelation oven where the opaque backing coat 90 is gelled as indicated at step 12 in FIG. 1b.

The composite film 66 resulting from gelation step 12 is an intermediate which is ready to be laminated to a selected support medium. In arriving at this intermediate film product 66 the initial transparent vinyl film 16 has passed through a decorative printing step, the discontinuous application of the plastisol paste 88 and the application of the uniform opaque backing coating 90.

The support medium may consist of a calendered vinyl sheet, an unexpanded cellular sheet, an asbestos felt, a woven or non-woven fabric, wood, metal, etc. The support medium is, accordingly, selected in accordance with the intended usage of the finished product. Furthermore, as indicated in FIG. 1b, the support medium can be comprised of a plurality of layers of material with each layer having a different composition.

Figure 2E:
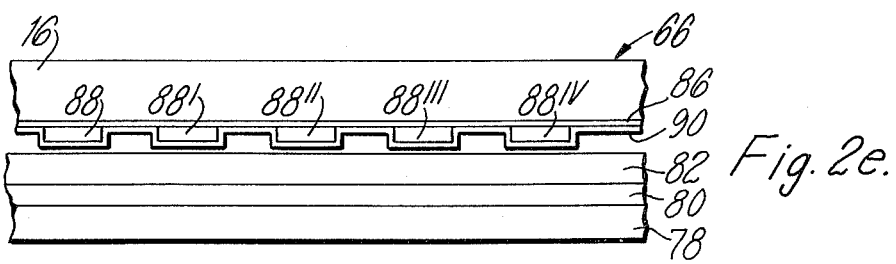
Figure 2F:
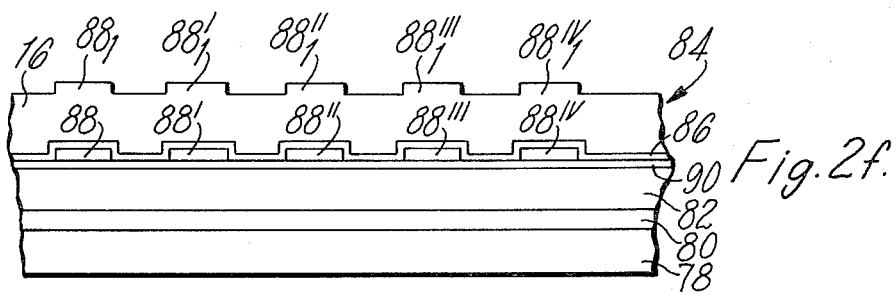

The lamination step is preferably performed as a continuous process in an endless belt press. As depicted in FIG. 1b, the endless belt press comprises a heated cylinder 68 and a continuous belt 70 supported and carried by rollers 72, 74 and 76. The lamination of the film intermediate 66 and the support medium is achieved between the heated cylinder 68 and the endless belt 70. In order to prevent the relief from being disturbed or destroyed by pressure or thermally induced flowing of the plastisol layer 88, at least one of the product contacting elements of the endless belt press must be comprised of or covered by a resilient material such as soft rubber. In the disclosed embodiment the endless belt 70 is comprised of a flexible rubber. Alternatively, the cylinder 68 could be provided with a soft rubber covering. In the course of lamination, the opaque background coating 90 of the intermediate film 66 is brought into direct contact with the support medium which, in the disclosed example, is comprised of layers 78, 80 and 82. The layers 78, 80 and 82, by means of heat and pressure, are thermo-welded together and to flim 66. FIGS. 2e and 2f respectively depict the product immediately before and immediately after passage between heated cylinder 68 and the resilient belt 70.

The lamination produced by the application of pressure and heat will result in the transparent film 16 flowing into the cavities defined by the relief on the verso of the film. These cavities correspond to the regions on the film where the intermediate layer of plastisol 88 has not been applied. Thus, when leaving the endless belt press, the finished product, indicated generally at 84, presents a relief on the recto of the vinyl film 16 which corresponds precisely with the relief previously created by the application of the plastisol paste 88 in a discontinuous manner.

In practicing the process of the present invention at least two and possibly three important heat treatment steps are performed. These heat treatments comprise the gelation of the relief defining plastisol paste, the lamination of the transparent printed film to the support and, optionally, the expansion of the relief paste and/or of the support. It is, of course, important that these various heat treatments take place between definite temperature limits. The gelation temperature of the plastisol paste depends on the formulation of the paste. A relatively low plastisol gelation temperature, in the range of 120°–130°C, can be obtained through judicious choice of the PVC quality. Use of a plastisol with a low gelation temperture allows much higher printing speeds and thus increases production. The lamination temperature is a function either of the adhesive used or the nature of the thermoplastic support medium. In the case of PVC supports very good adhesion results are obtained at a temperature of approximately 150°C. Care must be taken to avoid, during lamination, initiation of expansion in cases where a blowing agent is incorporated in the plastisol paste or in the support medium. The expansion temperature may be adjusted as a function of the proportion of activators in the formulation. In the case where azodicarbonamide is employed as the blowing agent the range of expansion temperatures will be between 160° to 210°C.

EXAMPLE 1

A transparent vinyl sheet having a thickness of 0.30 millimeters and having the following formation was formed by calendering:

| Ingredient | Parts by Weight |
| --- | --- |
| PVC (suspension grade) | 100 |
| Plasticizer (benzyl-butyl-phthalate) | 25 |
| Epoxyded soya oil | 7 |
| Stabilizer (organic derivative of barium-cadmium-zinc) | 3 |
| Processing agents [flow modifier (methyl methacrylate), lubricant (stearic acid), anti-UV agent, optical blue pigment, matting agent (aluminum silicate)] | 3 |

The transparent sheet was printed with a decoration in photogravure with inks on the base of cetonic solvents. The paste to give the relief effect was then applied as an intermediate layer having a thickness of 0.20 millimeters. The paste had the following formulation:

| Ingredient | Parts by Weight |
| --- | --- |
| PVC (emulsion grade) | 100 |
| Plasticizer (modified phthalate) | 60 |
| Epoxyded soya oil | 5 |
| Dolomite filler | 20 |
| Pigments | 10 |
| Stabilizer (organic cadmium zinc compounds) | 2 |
| Various processing agents for rheology purposes (secondary plasticizers and surfactants) | 12 |

The composite was heated for a period of 1–3 minutes at a temperature between 120° and 150°C to gel the relief defining material. A filled plastisol opaque gellable backing coating having the same shade as the relief pattern defining paste was then applied.

The opaque coating included the following ingredients:

PVC (emulsion grade)
Plasticizer (dioctylphthalate)
Epoxyded soya oil
Stabilizer (organic calcium and zinc compound)
mineral filler (calcium carbonate)
pigments
white spirit (to adjust the viscosity)

Two vinyl supports with a formulation similar to that of the transparent film but with the addition of 120 parts of chalk filling and 5 parts of pigment were separately calendered to a thickness of approximately 0.50 millimeter each and the three sheets were then laminated on an endless belt press at 150°C. The entire product was then dimensionally stabilized by passing through an over at 120°C. After lamination the relief on the verso of the transparent sheet, as defined by the discontinuously applied plastisol, appeared on the recto of the transparent sheet and an entirely calendered product presenting a relief of 0.20 millimeters was obtained.

EXAMPLE 2

The process used and the formulation of the different products were similar to those chosen in example 1 with the exception that a blowing agent was added to the plastisol paste which provided the relief. After lamination in an endless belt press the paste was expanded in an oven at 180°C to enhance the thickness of the relief initially obtained after the laminating operation. Depending on the amount of blowing agent employed the relief thickness (depth) could be doubled or trebled.

EXAMPLE 3

With the exception of the support layer the formulation of the different products and the process was identical to those of example 2. The support was comprised of an asbestos felt coated with an expansible plastisol by means of a scraper. This plastisol was subsequently gelled at a temperature in the range of 120°–150°C. After lamination with the printed film the product was expanded in an oven at 180°C. The relief product produced consisted of an asbestos support and a vinyl cellular intermediate protected by a transparent layer.

One of the advantages of coverings manufactured in accordance with the present invention is that the decoration is printed on the verso of the transparent sheet. Since the transparent sheet forms a protective layer, the decoration will remain unaltered until the transparent sheet has been completely worn through.

A principal advantage of a process in accordance with the present invention is the ability to obtain decorations and reliefs of a most complex nature with ease and precision thus guaranteeing a finished product of high quality. This result is, in part, due to the fact that the present invention for the first time makes it possible to successfully manufacture a relief composite synthetic covering material without having to make recourse to the use of expansible materials.

The technique of the present invention also permits the production of storable intermediates which can later be laminated to different support mediums; i.e., the present invention may be practiced in a discontinuous manner with semi-finished products stored for later use.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for the manufacture of sheet material having a textured wear surface comprising the steps of:

printing a decoration on the verso of a sheet of transparent thermoplastic resinous material;

drying the printed decoration;

printing at least one discontinuous intermediary layer of vinyl resin plastisol over selected regions of the printed decoration, the plastisol being applied so as to be in registration with at least portions of the decoration and being applied in regions which are to form the raised relief portions of the textured end product surface;

dimensionally stabilizing the plastisol by subjecting the printed sheet to a temperature in excess of 120°C; and laminating the transparent sheet to a support without destroying the relief pattern defined by the plastisol, lamination being affected by the application of heat and pressure, the verso of the transparent sheet facing the support during lamination and the transparent thermoplastic sheet material flowing into the cavities defined by the discontinuous intermediary layer of plastisol during lamination whereby the discontinuous intermediary layer applied on the verso of the transparent sheet will cause formation of a relief on the recto of the finished product.

2. The method of claim 1 wherein the printed decoration is comprised of an ink which is not opaque, said method further comprising the step of:

depositing a uniform and opaque coating over the printed decoration prior to printing the discontinuous intermediary layer.

3. The method of claim 1 wherein the printed decoration is comprised of an ink which is not opaque, said method further comprising the step of:

depositing an opaque coating over the discontinuous intermediary layer of plastisol and the printed decoration prior to laminating without destroying the relief pattern defined by the plastisol.

4. The method of claim 1 wherein the plastisol includes a blowing agent, said method further comprising the step of:

expanding the intermediary layer subsequent to lamination to enhance the relief of the surface of the finished product.

5. The method of claim 2 wherein the plastisol includes a blowing agent, said method further comprising the step of:

expanding the intermediary layer subsequent to lamination to enhance the relief of the surface of the finished product.

6. The method of claim 3 wherein the plastisol includes a blowing agent, said method further comprising the step of:

expanding the intermediary layer subsequent to lamination to enhance the relief of the surface of the finished product.

7. The method of claim 1 wherein the step of laminating comprises:

supporting the transparent sheet on the belt of a belt press with the recto of the sheet contacting the belt; and delivering the support between the verso of the printed sheet and a heated clyinder of the press.

8. The method of claim 1 wherein the step of applying the discontinuous intermediary layer comprises:

depositing a vinyl resin plastisol through a screen printing cylinder operated in synchronism with the means by which the decoration is printed.

9. The method of claim 8 wherein the step of laminating comprises:

supporting the transparent sheet on the belt of a belt press with the recto of the sheet contacting the belt; and delivering the support between the verso of the printed sheet and a heated cylinder of the press.

10. The method of claim 9 wherein the printed decoration is comprised of an ink which is not opaque, said method further comprising the step of:

depositing an opaque coating over the discontinuous intermediary layer of plastisol and the printed decoration prior to laminating without destroying the relief pattern defined by the plastisol.

11. The method of claim 9 wherein the plastisol includes a blowing agent, said method further comprising the step of:

expanding the intermediary layer subsequent to lamination to enhance the relief of the surface of the finished product.

* * * * *